(12) United States Patent
Chang et al.

(10) Patent No.: US 10,742,297 B2
(45) Date of Patent: Aug. 11, 2020

(54) CQI AND PMI OFFSET FOR UNLICENSED EMTC TRANSMISSION

(71) Applicant: Intel IP Corporation, Santa Clara, CA (US)

(72) Inventors: Wenting Chang, Beijing (CN); Huaning Niu, Milpitas, CA (US); Salvatore Talarico, Sunnyvale, CA (US); Rongrong Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/259,715

(22) Filed: Jan. 28, 2019

(65) Prior Publication Data

US 2019/0229794 A1 Jul. 25, 2019

Related U.S. Application Data

(63) Continuation of application No. PCT/CN2018/074566, filed on Jan. 30, 2018.

(51) Int. Cl.
*H04B 7/06* (2006.01)
*H04W 56/00* (2009.01)
(Continued)

(52) U.S. Cl.
CPC ......... *H04B 7/0639* (2013.01); *H04B 7/0626* (2013.01); *H04B 7/0632* (2013.01);
(Continued)

(58) Field of Classification Search
None
See application file for complete search history.

(56) References Cited

U.S. PATENT DOCUMENTS

2017/0141831 A1\* 5/2017 Rico Alvarino ........ H04W 4/70
2018/0069589 A1\* 3/2018 Liu ....................... H04B 1/0057
(Continued)

*Primary Examiner* — Ayaz R Sheikh
*Assistant Examiner* — Tarell A Hampton
(74) *Attorney, Agent, or Firm* — Kowert, Hood, Munyon, Rankin & Goetzel, P.C.

(57) ABSTRACT

An apparatus and method for CSI reporting in the unlicensed band are described. CRS-RSs are transmitted from a RAN in narrowband data channels in the unlicensed band to an eMTC UE. The UE determines the CQI and PMI from the CRS-RSs and transmits a periodic CSI report to the RAN that contains the CQI and PMI. The periodic CSI report is received at a $n_{sf}^{rel}$ th subframe of a $n_{mframe}$ th mframe, where $n_{mframe}$ satisfies $n_{mframe} \bmod N_{pd,mframe} = N_{OFFSET,mframe}$ where $N_{mframe}$ is a reporting period in terms of mframes and $N_{OFFSET,mframe}$ is a reporting period offset in terms of mframes, and $n_{sf}^{rel}$ satisfies $n_{sf}^{rel} - 20 = N_{OFFSET,CQI}$ where $N_{OFFSET,CQI}$ is a reporting period offset in subframes.

21 Claims, 4 Drawing Sheets

(51) Int. Cl.
*H04W 72/04* (2009.01)
*H04L 5/00* (2006.01)
*H04W 16/14* (2009.01)

(52) U.S. Cl.
CPC .......... *H04L 5/0057* (2013.01); *H04L 5/0082* (2013.01); *H04W 16/14* (2013.01); *H04W 56/004* (2013.01); *H04W 72/0446* (2013.01); *H04L 5/001* (2013.01); *H04L 5/0023* (2013.01); *H04L 5/0048* (2013.01)

(56) References Cited

U.S. PATENT DOCUMENTS

| | | | |
|---|---|---|---|
| 2018/0070243 A1* | 3/2018 | Liu | H04W 4/70 |
| 2018/0220257 A1* | 8/2018 | Bhattad | H04W 4/70 |
| 2018/0254815 A1* | 9/2018 | Liu | H04B 7/0456 |
| 2019/0052996 A1* | 2/2019 | Sahai | G01S 5/10 |
| 2019/0149190 A1* | 5/2019 | Liu | H04W 4/025 |
| | | | 375/132 |
| 2019/0165894 A1* | 5/2019 | Choi | H04L 1/1887 |
| 2019/0215044 A1* | 7/2019 | Noh | H04B 7/0421 |
| 2019/0364546 A1* | 11/2019 | Kwak | H04L 1/18 |

* cited by examiner

CQI AND PMI OFFSET FOR UNLICENSED EMTC TRANSMISSION

PRIORITY CLAIM

This patent application is a continuation of International Application Number PCT/CN2018/074566, filed on Jan. 30, 2018, which is hereby incorporated by reference herein in its entirety.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to LTE operation in the unlicensed spectrum using MulteFire, specifically the Internet of Things (IoT) operating in the unlicensed spectrum.

BACKGROUND

The use of 3GPP systems has increased due to both an increase in the types of devices user equipment (UEs) using network resources as well as the amount of data and bandwidth being used by various applications, such as video streaming, operating on these UEs. In particular, typical UEs such as cell phones, as well as enhanced Machine Type Communication (eMTC) UEs and Narrowband Internet of Things (NB-IoT) UEs currently use 3GPP systems, which will soon be extended to 5G systems. The latter such UEs, may include sensors (e.g., sensing environmental conditions) or microcontrollers in appliances or vending machines. The number of eMTC UEs and NB-IoT UEs in use is expected to increase massively, thus leading to further network development in an attempt to accommodate for the disparate requirements of the different types of UEs and to increase throughput to the UEs. In particular, a number of developments have focused on the use of the unlicensed spectrum to provide additional communication channels with which the radio access networks (RANs) and UEs communicate.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
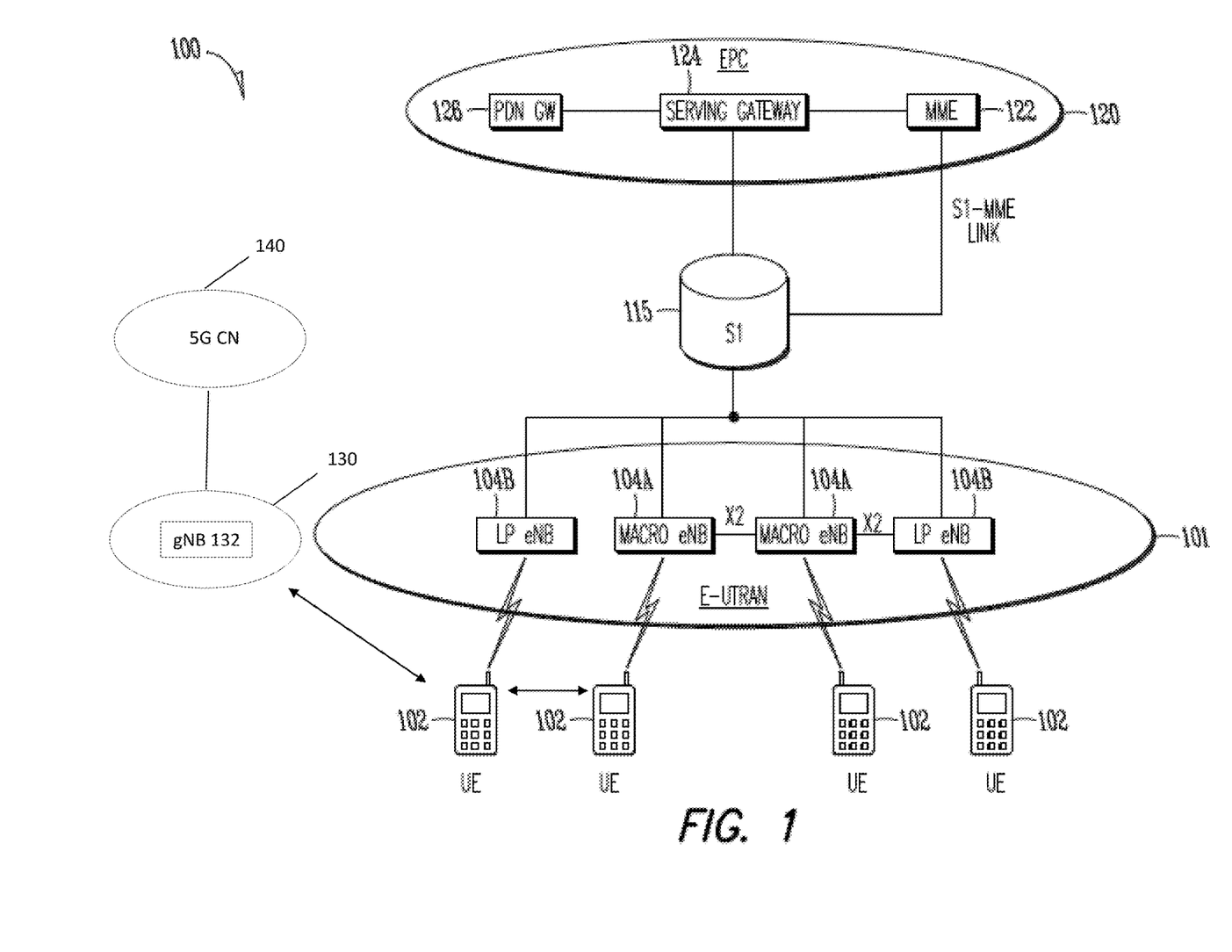
FIG. 1 shows an example of a network architecture in accordance with some embodiments.

FIG. 1 shows an example of a network architecture in accordance with some embodiments. As used herein, an LTE network refers to both LTE and LTE Advanced (LTE-A) networks as well as other versions of LTE networks to be developed. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example. In addition to the RAN 101, the network 100 may include one or more next generation (NG) RANs 130 each containing one or more standalone gNBs 132 and connected to a 5G core network (5GC) 140 through a new radio (NR) air-interface.

The core network 120 may include a mobility management entity (MME) 122, serving gateway (SGW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. Other elements, such as a Home Location Register (HLR)/Home Subscriber Server (HSS), a database including subscriber information of a 3GPP network that may perform configuration storage, identity management and user state storage, and a Policy and Charging Rule Function (PCRE) that performs policy decision for dynamically applying Quality of Service (QoS) and charging policy per service flow, are not shown for convenience. In some embodiments, the eNBs 104 may act as dual mode eNBs, providing LTE/4G and 5G service to the UEs 102. In some embodiments, the 5G RAN 130 may be a booster cell that is connected to an anchor RAN 101.

The MME 122 may be similar in function to the control plane of legacy Serving GPRS Support Nodes (SGSN). The MME 122 may manage mobility aspects in access such as gateway selection and tracking area list management, performing both mobility management (MM) and session management (SM). The Non-Access Stratum (NAS) is a part of the control plane between a UE 102 and the MME 122. The NAS is used for signaling between the UE 102 and the EPC in the LTE/UMTS protocol stack. The NAS supports UE mobility and session management for establishing and maintaining an IP connection between the UE 102 and PDN GW 126.

The serving GW 124 may terminate the user plane interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and policy enforcement, packet routing, idle mode packet buffering, and triggering an MME to page a UE. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN. The PDN GW 126 may perform policy enforcement and charging data collection UE IP address assignment, packet screening and filtering. The PDN GW 126 may also provide an anchor point for mobility devices with a non-LTE access. The external PDN can be any kind of IP network, as well as an IP Multimedia Subsystem (IMS) domain. The PDN GW 126 and the serving GW 124 may be implemented in a single physical node or separate physical nodes. In some embodiments, the 5G CN 140 may be connected with the EPC 120 through a S6a interface to an HSS of the EPC 120, and may or may not, in some embodiments, be connected through the PDN GW 126.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller functions) such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers. The UEs 102 may communicate with the RAN 101, the 5G RAN 130 and/or with each other (device-to-device (D2D) communication) via e.g., a Dedicated Short-Range Communications (DSRC) link. The DSRC standards suite is based on multiple cooperating standards that have been mainly developed by the IEEE and are based on the IEEE 802.11 standard.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or the cells may operate on different frequency bands with each cell operating in a different frequency band or only cells of different sizes operating on different frequency bands. As used herein, the term LP eNB refers to any suitable relatively LP eNB for implementing a smaller cell (smaller than a macro cell) such as a femtocell, a picocell, or a microcell.

Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB. In some embodiments, when the LP eNB 104b is a Home eNB (HeNB), a HeNB Gateway may be provided between the HeNB and the MME/Service Gateway. This HeNB Gateway may control multiple HeNBs and provide user data and signal traffic from the HeNBs towards the MME/Service Gateway. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality and/or connect via an S1 interface to an MIME/Service Gateway. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Figure 2:
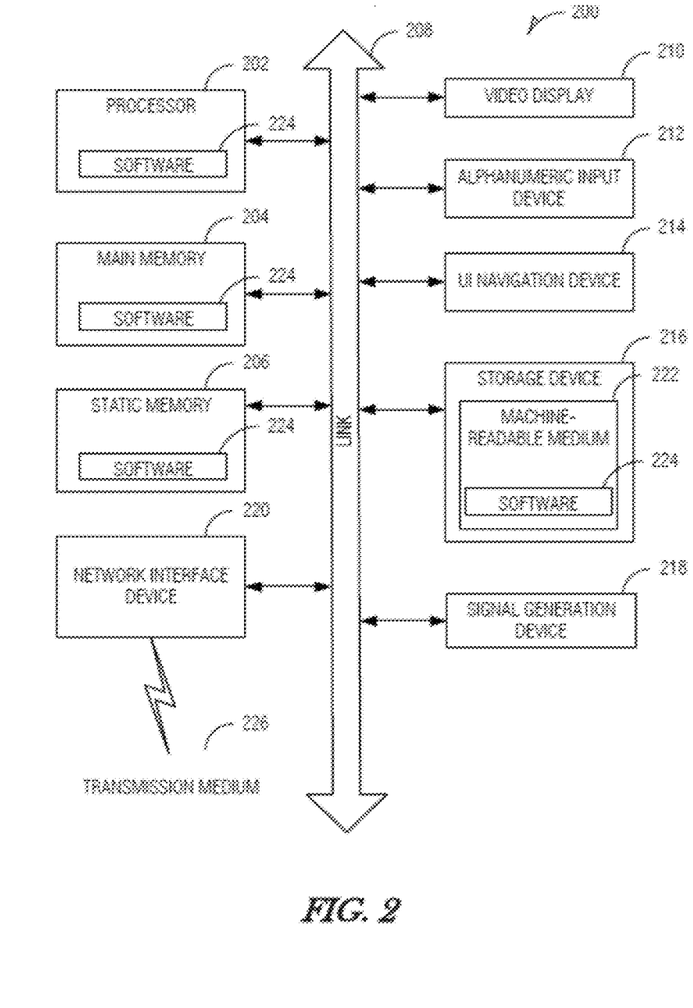
FIG. 2 illustrates a block diagram of a device in accordance with some embodiments.

FIG. 2 illustrates a block diagram of a device in accordance with some embodiments. The device may be a UE or base station (e.g., eNB, or gNB), among others. The device 200 may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hard-wired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The device 200 may include a hardware processor 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the device 200 and that cause the device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as IEEE 802.16 family of standards known as WiMax, IEEE 802.15.4 family of standards, a LTE family of standards, a Universal Mobile Telecommunications System (UMTS) family of standards, peer-to-peer (P2P) networks, or a NG standard among others. In an example, the network interface device 220 may include one or more physical jacks (e.g., Ethernet, coaxial, or phone jacks) or one or more antennas to connect to the transmission medium 226.

IoT may enable connectivity between a large number of devices. IoT has a wide variety of applications in various scenarios, including smart cities, smart environment, smart agriculture, and smart health systems. 3GPP has standardized two designs to support IoT services, as above eMTC and NB-IoT. As eMTC and NB-IoT UEs are likely to be deployed in huge numbers, lowering the cost of these UEs is an enabler for implementation of IoT. In addition, low power consumption is desirable to extend the life time of the battery in such devices. In addition, there are substantial use cases of devices deployed deep inside buildings, thereby using coverage enhancement in comparison to the defined LTE cell coverage footprint. eMTC, and NB-IoT techniques are designed to ensure that the UEs have low cost, low power consumption, and enhanced coverage.

As above, UEs, including eMTC and NB-IoT UEs, may operate in the licensed spectrum. However, the scarcity of licensed spectrum may result in insufficient bandwidth for UE use, especially due to the advent of 5G communications, leading to a reduction in data rate. This has caused interest in communication using the unlicensed spectrum including Carrier Aggregation (CA) based on Licensed Assisted Access (LAA)/enhanced LAA (eLAA) systems, LTE operation in the unlicensed spectrum via dual connectivity (DC), and standalone LTE systems in the unlicensed spectrum. In the latter of these, called MulteFire, LTE-based technology may operate solely in unlicensed spectrum without use of an anchor in licensed spectrum.

To extend the benefits of LTE IoT designs into unlicensed spectrum, Multefire is expected to specify the design for Unlicensed-IoT (U-IoT or UIoT). U-IoT may refer to the operation of IoT devices in the unlicensed spectrum. Various embodiments discussed herein are related to U-IoT systems, and in particular, may be related to eMTC-based U-IoT designs. Similar approaches may be applied to NB-IoT-based U-IoT designs as well as eMTC-based U-IoT designs.

MulteFire and other unlicensed band techniques can be used in any unlicensed spectrum. MulteFire deployments are expected in the 5 GHz and 2.4 GHz unlicensed band and potentially also in the 3.5 GHz shared band in the United States. In a MulteFire network, eNBs and/or access points (APs) communicate solely in an unlicensed radio frequency spectrum band. This is different from LAA/LWA and other systems in which a channel in a licensed (LTE) frequency acts as an anchor channel to provide control information. Use of the unlicensed spectrum may impose transmission power limitations and protocols such as Clear Channel Assessment (CCA) and Listen-Before-Talk (LBT) transmission rules if the channel is occupied.

When using the unlicensed bands, RAN nodes (eNB, gNB) and UEs may determine channel availability via energy detection before transmitting data on the channel. For example, the RAN node or UE may determine that the channel is occupied through a predetermined amount of energy being present in the channel or via a change in a received signal strength indication (RSSI). The RAN node or UE may detect the presence of a specific sequence, such as a preamble transmitted prior to a data transmission, that indicates use of the channel.

The unlicensed channel may be reserved using a reservation signal to prevent WiFi signals from initiating transmission until the next frame boundary event. Thus, the RAN node and UEs may contend for access to the unlicensed frequency band by performing CCA procedures, and transmitting during transmission opportunities (TxOPs).

In some embodiments, the unlicensed frequency band of interest may be in the 2.4 GHz band. For global availability, the design may abide by the regulations in different regions (e.g., the regulations given by Federal Communications Commission (FCC) in the United States and the regulations given by European Telecommunications Standards Institute (ETSI) in Europe). Based on these regulations, frequency hopping is more appropriate than other forms of modulation, due to more relaxed power spectrum density (PSD) limitations and co-existence with other unlicensed band technologies, such as Bluetooth and WiFi. Specifically, frequency hopping (intra- or inter-subframe) may have no PSD limit, while other wideband modulations may have a PSD limit of 1.0 dBm/MHz in regulations given by ETSI. A low PSD limit may result in more limited coverage for the eNB. Thus, U-IoT with frequency hopping is described below.

Some embodiments provide random access channel (RACH) procedure designs and RACH procedures for U-IoT. RACH procedures and procedure designs may include a RACH procedure with an anchor channel, the RACH physical channel, the RACH channel location and anchor channel design and signaling. Similarly, the IoT-U design for a sub-1 GHz band may include an anchor channel bandwidth of 180 KHz. This may be due to regulation constraints in China and the European Union (EU), for example.

In the LTE system, various types of reference signals (RS) may be transmitted by the gNB for a UE to measure. The reference signals may include, for example, cell-specific (or common) reference signals (CRS-RS), UE-specific reference signals (DMRS) or Channel State Information-Reference Signals (CSI-RS). The CRS-RS may be used for cell search and initial acquisition, demodulation and channel quality estimation. The DMRS may be used for PDSCH demodulation by the UE, as well as for handover. CSI-RS reference signals may be used to provide an indication of channel quality at a specific time.

In some embodiments, the eMTC UE measures the CRS-RS. The CRS-RS measurements may be used to determine a Channel Quality Indicator (CQI), Precoding Matrix Index (PMI), precoding type indicator (PTI), CSI-RS resource indicator (CRI), and/or Rank Indicator (RI). The CQI indicates the highest modulation and the code rate at which the block error rate (BLER) of the channel being analyzed does not exceed 10%. The CQI accepts discrete values between 0 and 15. The CQI index reported to the eNB by the eMTC UE may be derived from the quality of the downlink signal. The precoding matrix may determine how the individual data streams (layers) are mapped to the antennas. Selecting the matrix may yield a maximum number of data bits, which the eMTC UE can receive together across all layers. If the eMTC UE knows what the allowed precoding matrices are, the eMTC UE can send a PMI report to the eNB and suggest a suitable matrix. The eMTC UE uses mframes, which may each be 80 ms in length and thus contain 80 lms subframes. The mframes may include a 5 ms anchor segment on a fixed anchor channel and 75 ms data segment on one or more data channels. The data channels may be selected by frequency hopping.

Figure 3:
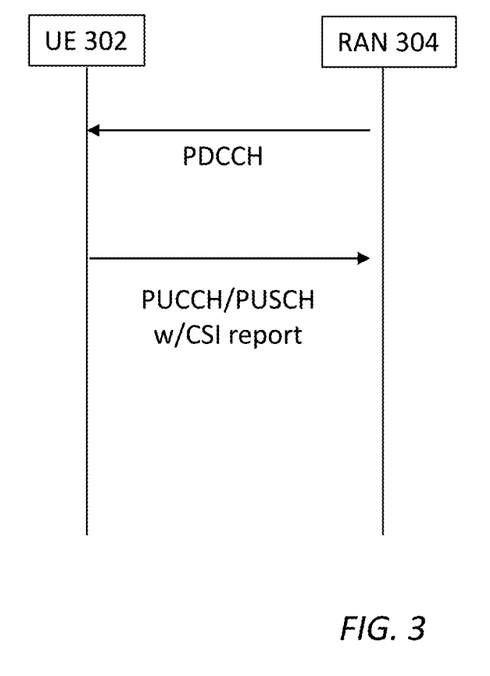
FIG. 3 illustrates transmission of a periodic Channel State Information (CSI) report in accordance with some embodiments.

FIG. 3 illustrates transmission of a periodic Channel State Information (CSI) report in accordance with some embodiments. The CSI report may be provided from the UE 302 to the RAN node 304. The CSI report, which may be periodic or aperiodic, may provide one or more different indicators. The indicators may include the CQI, PMI, PTI, CRI, and/or RI. The CSI may measure quality across the entire spectrum (e.g., 20 MHz) (called wideband CQI) or across only a fraction of the spectrum (e.g., 1.4 MHz) (called subband CQI). Periodic CSI reporting may occur over a physical uplink control channel (PUCCH) transmission when a physical uplink shared channel (PUSCH) transmission is not scheduled in the CSI report subframe or the PUSCH when scheduled and simultaneous PUCCH and PUSCH transmission are not enabled Aperiodic CSI reporting is provided on a PUSCH transmission. A Radio Resource Control (RRC) message, such as the RRC Connection Setup and RRC Connection Reconfiguration message, may be used to specify the CSI report configuration. For a periodic CSI report, the subframe timing for transmission of the report by the UE may be calculated by the UE based on parameters in the RRC message.

In some embodiments, the periodicity of the CSI reporting CQI/PMI in the eMTC-U system is configured to be $2^n$ mframes, n=0–5 (i.e., 1/2/4/8/16/32 mframes). A specific indication of the subframe and the mframe used for PMI/CQI reporting in the unlicensed band for eMTC UEs using frequency hopping is described herein. In some embodiments, the eMTC-U system uses a frequency hopping in which the hopping sequence depends on the success (or failure) of the carrier sensing procedure.

In one embodiment, for periodic CSI reporting, the PMI/CQI is reported at the $n_{sf}^{rel}$ th subframe of the $n_{mframe}$ th mframe, where $n_{mframe}$ satisfies the following equation:

$$n_{mframe} \bmod N_{pd,mframe} = N_{OFFSET,mframe}$$

where $N_{mframe}$ is the reporting period in terms of mframes, while $N_{OFFSET,mframe}$ is the reporting period offset in terms of mframes. Note that this may apply if only one narrowband group is configured in the unlicensed band.

At the $n_{mframe}$ th mframe, the subframe $n_{sf}^{rel}$ may be utilized to transmit the PMI/CQI report if:

$$n_{sf}^{rel} - 20 = N_{OFFSET,CQI}$$

where $N_{OFFSET,CQI}$ is the reporting period offset in subframes. The subframe may be one of the 75 subframes used by the data channels. Furthermore, as only some of the data channels may be used for UL communications (as determined by the UL/DL configuration), the number of subframes used for the CSI report may be further limited. For example, independent of the UL/DL configuration, the first 15 subframes may be DL subframes, leaving only 60 subframes to select among for transmission of the CSI report.

In another embodiment, the CQI and PMI can be configured at any mframe with period 80/160/320/640/1280/2560 ms ($80 \ast 2^n$, n=0–5), that is:

The configuration for a 80/160/320/640 ms period is listed in Table 1

The configuration for a 1280 ms period is listed in Table 2

The configuration for a 2560 ms period is listed in Table 3

TABLE 1

| $I_{CQI/PMI}$ | Value of $N_{pd,mframe}$ | Value of $N_{OFFSET,CQI}$ | mframe offset $N_{OFFSET,mframe}$ |
|---|---|---|---|
| $0 \le I_{CQI/PMI} \le 59$ | 1 | $I_{CQI/PMI}$ | 0 |
| $60 \le I_{CQI/PMI} \le 119$ | 2 | $I_{CQI/PMI}-60$ | 0 |
| $120 \le I_{CQI/PMI} \le 179$ | 2 | $I_{CQI/PMI}-120$ | 1 |
| $180 \le I_{CQI/PMI} \le 239$ | 4 | $I_{CQI/PMI}-180$ | 0 |
| $240 \le I_{CQI/PMI} \le 299$ | 4 | $I_{CQI/PMI}-240$ | 1 |
| $300 \le I_{CQI/PMI} \le 359$ | 4 | $I_{CQI/PMI}-300$ | 2 |
| $360 \le I_{CQI/PMI} \le 319$ | 4 | $I_{CQI/PMI}-360$ | 3 |
| $420 \le I_{CQI/PMI} \le 479$ | 8 | $I_{CQI/PMI}-420$ | 0 |
| $480 \le I_{CQI/PMI} \le 539$ | 8 | $I_{CQI/PMI}-480$ | 1 |
| $540 \le I_{CQI/PMI} \le 599$ | 8 | $I_{CQI/PMI}-540$ | 2 |
| $600 \le I_{CQI/PMI} \le 659$ | 8 | $I_{CQI/PMI}-600$ | 3 |
| $660 \le I_{CQI/PMI} \le 719$ | 8 | $I_{CQI/PMI}-660$ | 4 |
| $720 \le I_{CQI/PMI} \le 779$ | 8 | $I_{CQI/PMI}-720$ | 5 |
| $780 \le I_{CQI/PMI} \le 839$ | 8 | $I_{CQI/PMI}-780$ | 6 |
| $840 \le I_{CQI/PMI} \le 899$ | 8 | $I_{CQI/PMI}-840$ | 7 |

TABLE 2

| $I_{CQI/PMI}$ | Value of $N_{pd,mframe}$ | Value of $N_{OFFSET,CQI}$ | mframe offset $N_{OFFSET,mframe}$ |
|---|---|---|---|
| 900 ≤ $I_{CQI/PMI}$ ≤ 959 | 16 | $I_{CQI/PMI}$-900 | 0 |
| 960 ≤ $I_{CQI/PMI}$ ≤ 1019 | 16 | $I_{CQI/PMI}$-960 | 1 |
| 1080 ≤ $I_{CQI/PMI}$ ≤ 1139 | 16 | $I_{CQI/PMI}$-1080 | 2 |
| 1140 ≤ $I_{CQI/PMI}$ ≤ 1199 | 16 | $I_{CQI/PMI}$-1140 | 3 |
| 1200 ≤ $I_{CQI/PMI}$ ≤ 1259 | 16 | $I_{CQI/PMI}$-1200 | 4 |
| 1260 ≤ $I_{CQI/PMI}$ ≤ 1319 | 16 | $I_{CQI/PMI}$-1260 | 5 |
| 1320 ≤ $I_{CQI/PMI}$ ≤ 1379 | 16 | $I_{CQI/PMI}$-1320 | 6 |
| 1380 ≤ $I_{CQI/PMI}$ ≤ 1439 | 16 | $I_{CQI/PMI}$-1380 | 7 |
| 1440 ≤ $I_{CQI/PMI}$ ≤ 1499 | 16 | $I_{CQI/PMI}$-1440 | 8 |
| 1500 ≤ $I_{CQI/PMI}$ ≤ 1559 | 16 | $I_{CQI/PMI}$-1500 | 9 |
| 1560 ≤ $I_{CQI/PMI}$ ≤ 1619 | 16 | $I_{CQI/PMI}$-1560 | 10 |
| 1620 ≤ $I_{CQI/PMI}$ ≤ 1679 | 16 | $I_{CQI/PMI}$-1620 | 11 |
| 1680 ≤ $I_{CQI/PMI}$ ≤ 1739 | 16 | $I_{CQI/PMI}$-1680 | 12 |
| 1740 ≤ $I_{CQI/PMI}$ ≤ 1799 | 16 | $I_{CQI/PMI}$-1740 | 13 |
| 1800 ≤ $I_{CQI/PMI}$ ≤ 1859 | 16 | $I_{CQI/PMI}$-1800 | 14 |
| 1060 ≤ $I_{CQI/PMI}$ ≤ 1919 | 16 | $I_{CQI/PMI}$-1860 | 15 |

TABLE 3

| $I_{CQI/PMI}$ | Value of $N_{pd,mframe}$ | Value of $N_{OFFSET,CQI}$ | mframe offset $N_{OFFSET,mframe}$ |
|---|---|---|---|
| 1920 ≤ $I_{CQI/PMI}$ ≤ 1979 | 32 | $I_{CQI/PMI}$-1920 | 0 |
| 1980 ≤ $I_{CQI/PMI}$ ≤ 2039 | 32 | $I_{CQI/PMI}$-1980 | 1 |
| 2040 ≤ $I_{CQI/PMI}$ ≤ 2099 | 32 | $I_{CQI/PMI}$-2040 | 2 |
| 2100 ≤ $I_{CQI/PMI}$ ≤ 2159 | 32 | $I_{CQI/PMI}$-2100 | 3 |
| 2160 ≤ $I_{CQI/PMI}$ ≤ 2219 | 32 | $I_{CQI/PMI}$-2160 | 4 |
| 2200 ≤ $I_{CQI/PMI}$ ≤ 2279 | 32 | $I_{CQI/PMI}$-2200 | 5 |
| 2280 ≤ $I_{CQI/PMI}$ ≤ 2339 | 32 | $I_{CQI/PMI}$-2280 | 6 |
| 2340 ≤ $I_{CQI/PMI}$ ≤ 2399 | 32 | $I_{CQI/PMI}$-2340 | 7 |
| 2400 ≤ $I_{CQI/PMI}$ ≤ 2459 | 32 | $I_{CQI/PMI}$-2400 | 8 |
| 2460 ≤ $I_{CQI/PMI}$ ≤ 2519 | 32 | $I_{CQI/PMI}$-2460 | 9 |
| 2520 ≤ $I_{CQI/PMI}$ ≤ 2579 | 32 | $I_{CQI/PMI}$-2520 | 10 |
| 2580 ≤ $I_{CQI/PMI}$ ≤ 2639 | 32 | $I_{CQI/PMI}$-2580 | 11 |
| 2640 ≤ $I_{CQI/PMI}$ ≤ 2699 | 32 | $I_{CQI/PMI}$-2640 | 12 |
| 2700 ≤ $I_{CQI/PMI}$ ≤ 2759 | 32 | $I_{CQI/PMI}$-2700 | 13 |
| 2760 ≤ $I_{CQI/PMI}$ ≤ 2819 | 32 | $I_{CQI/PMI}$-2760 | 14 |
| 2820 ≤ $I_{CQI/PMI}$ ≤ 2879 | 32 | $I_{CQI/PMI}$-2820 | 15 |
| 2880 ≤ $I_{CQI/PMI}$ ≤ 2939 | 32 | $I_{CQI/PMI}$-2880 | 16 |
| 2940 ≤ $I_{CQI/PMI}$ ≤ 2999 | 32 | $I_{CQI/PMI}$-2940 | 17 |
| 3000 ≤ $I_{CQI/PMI}$ ≤ 3059 | 32 | $I_{CQI/PMI}$-3000 | 18 |
| 3060 ≤ $I_{CQI/PMI}$ ≤ 3119 | 32 | $I_{CQI/PMI}$-3060 | 19 |
| 3120 ≤ $I_{CQI/PMI}$ ≤ 3179 | 32 | $I_{CQI/PMI}$-3120 | 20 |
| 3180 ≤ $I_{CQI/PMI}$ ≤ 3239 | 32 | $I_{CQI/PMI}$-3180 | 21 |
| 3240 ≤ $I_{CQI/PMI}$ ≤ 3299 | 32 | $I_{CQI/PMI}$-3240 | 22 |
| 3300 ≤ $I_{CQI/PMI}$ ≤ 3359 | 32 | $I_{CQI/PMI}$-3300 | 23 |
| 3360 ≤ $I_{CQI/PMI}$ ≤ 3419 | 32 | $I_{CQI/PMI}$-3360 | 24 |
| 3420 ≤ $I_{CQI/PMI}$ ≤ 3479 | 32 | $I_{CQI/PMI}$-3420 | 25 |
| 3480 ≤ $I_{CQI/PMI}$ ≤ 3539 | 32 | $I_{CQI/PMI}$-3480 | 26 |
| 3540 ≤ $I_{CQI/PMI}$ ≤ 3599 | 32 | $I_{CQI/PMI}$-3540 | 27 |
| 3600 ≤ $I_{CQI/PMI}$ ≤ 3659 | 32 | $I_{CQI/PMI}$-3600 | 28 |
| 3660 ≤ $I_{CQI/PMI}$ ≤ 3719 | 32 | $I_{CQI/PMI}$-3660 | 29 |
| 3720 ≤ $I_{CQI/PMI}$ ≤ 3779 | 32 | $I_{CQI/PMI}$-3720 | 30 |
| 3780 ≤ $I_{CQI/PMI}$ ≤ 3839 | 32 | $I_{CQI/PMI}$-3780 | 31 |

Figure 4:
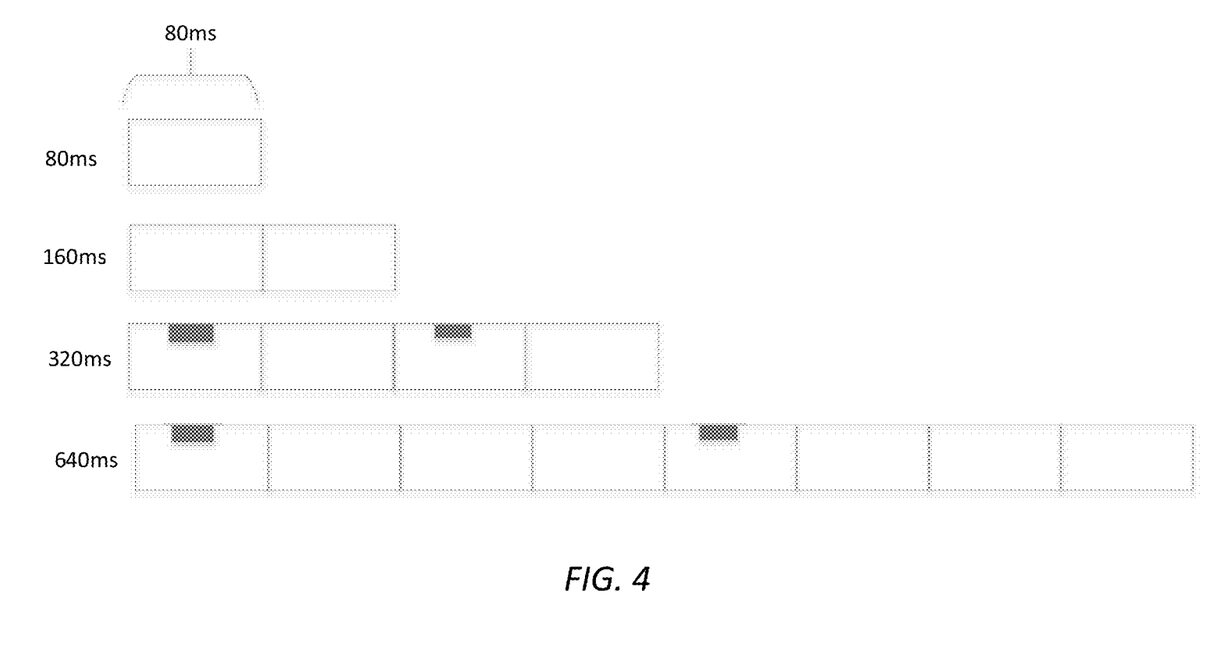
FIG. 4 illustrates a nesting structure in accordance with some embodiments.

In another embodiment, the configuration of CQI and PMI has a nesting structure. In this case, the CQI and PMI can share the same common PUCCH pool and avoid the scheduling impact to the PUSCH. The PUCCH occasion of the larger period overlaps with the PUCCH occasion of the shorter period. FIG. 4 illustrates a nesting structure in accordance with some embodiments. As shown, the occasions of CSI reporting with a period of 640 ms $N_{pd,mframe}$=8, overlaps with the occasions of CSI reporting with a period of 320 ms $N_{pd,mframe}$=4.

An example of a nesting structure is illustrated in Tables 4 and 5, where for a period larger than 1.60 ms, 240 occasions can be configured. Note that, as above, 60 subframes may be used, thus $I_{CQI/PMI}$ has incrementations of 60 in Tables 4 and 5.

TABLE 4

| $I_{CQI/PMI}$ | Value of $N_{pd,mframe}$ | Value of $N_{OFFSET,CQI}$ | mframe offset $N_{OFFSET,mframe}$ |
|---|---|---|---|
| 0 ≤ $I_{CQI/PMI}$ ≤ 59 | 1 | $I_{CQI/PMI}$ | 0 |
| 60 ≤ $I_{CQI/PMI}$ ≤ 119 | 2 | $I_{CQI/PMI}$-60 | 0 |
| 120 ≤ $I_{CQI/PMI}$ ≤ 179 | 2 | $I_{CQI/PMI}$-120 | 1 |
| 180 ≤ $I_{CQI/PMI}$ ≤ 239 | 4 | $I_{CQI/PMI}$-180 | 0 |
| 240 ≤ $I_{CQI/PMI}$ ≤ 299 | 4 | $I_{CQI/PMI}$-240 | 1 |
| 300 ≤ $I_{CQI/PMI}$ ≤ 359 | 4 | $I_{CQI/PMI}$-300 | 2 |
| 360 ≤ $I_{CQI/PMI}$ ≤ 319 | 4 | $I_{CQI/PMI}$-360 | 3 |
| 420 ≤ $I_{CQI/PMI}$ ≤ 479 | 8 | $I_{CQI/PMI}$-420 | 0 |
| 480 ≤ $I_{CQI/PMI}$ ≤ 539 | 8 | $I_{CQI/PMI}$-480 | 2 |
| 540 ≤ $I_{CQI/PMI}$ ≤ 599 | 8 | $I_{CQI/PMI}$-540 | 4 |
| 600 ≤ $I_{CQI/PMI}$ ≤ 659 | 8 | $I_{CQI/PMI}$-600 | 6 |
| 660 ≤ $I_{CQI/PMI}$ ≤ 719 | 16 | $I_{CQI/PMI}$-660 | 0 |
| 720 ≤ $I_{CQI/PMI}$ ≤ 779 | 16 | $I_{CQI/PMI}$-720 | 4 |
| 780 ≤ $I_{CQI/PMI}$ ≤ 839 | 16 | $I_{CQI/PMI}$-780 | 8 |
| 840 ≤ $I_{CQI/PMI}$ ≤ 899 | 16 | $I_{CQI/PMI}$-840 | 12 |
| 900 ≤ $I_{CQI/PMI}$ ≤ 959 | 32 | $I_{CQI/PMI}$-900 | 0 |
| 960 ≤ $I_{CQI/PMI}$ ≤ 1019 | 32 | $I_{CQI/PMI}$-960 | 8 |
| 1080 ≤ $I_{CQI/PMI}$ ≤ 1139 | 32 | $I_{CQI/PMI}$-1080 | 16 |
| 1140 ≤ $I_{CQI/PMI}$ ≤ 1199 | 32 | $I_{CQI/PMI}$-1140 | 24 |

TABLE 5

| $I_{CQI/PMI}$ | Value of $N_{pd,mframe}$ | Value of $N_{OFFSET,CQI}$ | mframe offset $N_{OFFSET,mframe}$ |
|---|---|---|---|
| 0 ≤ $I_{CQI/PMI}$ ≤ 59 | 1 | $I_{CQI/PMI}$ | 0 |
| 60 ≤ $I_{CQI/PMI}$ ≤ 119 | 2 | $I_{CQI/PMI}$-60 | 0 |
| 120 ≤ $I_{CQI/PMI}$ ≤ 179 | 2 | $I_{CQI/PMI}$-120 | 1 |
| 180 ≤ $I_{CQI/PMI}$ ≤ 239 | 4 | $I_{CQI/PMI}$-180 | 0 |
| 240 ≤ $I_{CQI/PMI}$ ≤ 299 | 4 | $I_{CQI/PMI}$-240 | 1 |
| 300 ≤ $I_{CQI/PMI}$ ≤ 359 | 4 | $I_{CQI/PMI}$-300 | 2 |
| 360 ≤ $I_{CQI/PMI}$ ≤ 319 | 4 | $I_{CQI/PMI}$-360 | 3 |
| 420 ≤ $I_{CQI/PMI}$ ≤ 479 | 8 | $I_{CQI/PMI}$-420 | 0 |
| 480 ≤ $I_{CQI/PMI}$ ≤ 539 | 8 | $I_{CQI/PMI}$-480 | 2 |
| 540 ≤ $I_{CQI/PMI}$ ≤ 599 | 8 | $I_{CQI/PMI}$-540 | 4 |
| 600 ≤ $I_{CQI/PMI}$ ≤ 659 | 8 | $I_{CQI/PMI}$-600 | 6 |
| 660 ≤ $I_{CQI/PMI}$ ≤ 719 | 16 | $I_{CQI/PMI}$-660 | 0 |
| 720 ≤ $I_{CQI/PMI}$ ≤ 779 | 16 | $I_{CQI/PMI}$-720 | 2 |
| 780 ≤ $I_{CQI/PMI}$ ≤ 839 | 16 | $I_{CQI/PMI}$-780 | 4 |
| 840 ≤ $I_{CQI/PMI}$ ≤ 899 | 16 | $I_{CQI/PMI}$-840 | 6 |
| 900 ≤ $I_{CQI/PMI}$ ≤ 959 | 32 | $I_{CQI/PMI}$-900 | 0 |
| 960 ≤ $I_{CQI/PMI}$ ≤ 1019 | 32 | $I_{CQI/PMI}$-960 | 2 |
| 1080 ≤ $I_{CQI/PMI}$ ≤ 1139 | 32 | $I_{CQI/PMI}$-1080 | 4 |
| 1140 ≤ $I_{CQI/PMI}$ ≤ 1199 | 32 | $I_{CQI/PMI}$-1140 | 6 |

Note that each of Tables 1-5 not all of the values may be used. Moreover, to conserve signaling, in some cases, not all of the offsets may be used. For example, in some embodiments the 2 bits may be used to provide $N_{OFFSET,mframe}$ (i.e., the maximum number of $N_{OFFSET,mframe}$ available may be 4). For periods of 640 ms or more (e.g., $N_{pd,mframe}$=8, for example, the offset values may be 0, 2, 4 and 6, rather than 0-7). In this case, the range of $I_{CQI/PMI}$ values associated with a particular value of $N_{pd,mframe}$ (e.g., 8) may be reduced from those shown.

In the above Detailed Description, various features may be grouped together to streamline the disclosure. However, the claims applicable to these features may not set forth every feature disclosed herein as embodiments may feature a subset of said features. Further, embodiments may include fewer features than those disclosed in a particular example.

What is claimed is:

1. An apparatus of an enhanced Machine Type Communication (eMTC) user equipment (UE), comprising:
   processing circuitry arranged to:
     decode cell-specific reference signals (CRS-RSs) from a base station in narrowband channels in an unlicensed band;

determine a Channel Quality Indicator (CQI) and Precoding Matrix Index (PMI) from the CRS-RSs; and
generate, for transmission to the base station in the unlicensed band, a periodic Channel State Information (CSI) report containing the CQI and PMI, the periodic CSI report generated at a $n_{sf}^{rel}$th subframe of a $n_{mframe}$th mframe, where $n_{mframe}$ satisfies:

$$n_{mframe} \bmod N_{pd,mframe} = N_{OFFSET,mframe}$$

where $N_{pd,\ mframe}$ is a reporting period in terms of mframes and $N_{OFFSET,mframe}$ is a reporting period offset in terms of mframes, and $n_{sf}^{rel}$ satisfies:

$$n_{sf}^{rel} - 20 = N_{OFFSET,CQI}$$

where $N_{OFFSET,CQI}$ is a reporting period offset in subframes; and
a memory configured to store $N_{pd,\ mframe}$, $N_{OFFSET,\ mframe}$ $N_{OFFSET,CQI}$.

2. The apparatus of claim 1, wherein a reporting period of the periodic CSI report comprises $80*2^n$ ms, where n=0-5.

3. The apparatus of claim 2, wherein:
a CQI configuration for a reporting period of 80 ms and 160 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $0 \le I_{CQI/PMI} \le 59$ | 1 | $I_{CQI/PMI}$ | 0 |
| $60 \le I_{CQI/PMI} \le 119$ | 2 | $I_{CQI/PMI} - 60$ | 0 |
| $120 \le I_{CQI/PMI} \le 179$ | 2 | $I_{CQI/PMI} - 120$ | 1. |

4. The apparatus of claim 2, wherein:
a CQI configuration for a reporting period of 320 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $180 \le I_{CQI/PMI} \le 239$ | 4 | $I_{CQI/PMI} - 180$ | 0 |
| $240 \le I_{CQI/PMI} \le 299$ | 4 | $I_{CQI/PMI} - 240$ | 1 |
| $300 \le I_{CQI/PMI} \le 359$ | 4 | $I_{CQI/PMI} - 300$ | 2 |
| $360 \le I_{CQI/PMI} \le 419$ | 4 | $I_{CQI/PMI} - 360$ | 3. |

5. The apparatus of claim 2, wherein:
a CQI configuration for a reporting period of 640 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $420 \le I_{CQI/PMI} \le 479$ | 8 | $I_{CQI/PMI} - 420$ | 0 |
| $480 \le I_{CQI/PMI} \le 539$ | 8 | $I_{CQI/PMI} - 480$ | 2 |
| $540 \le I_{CQI/PMI} \le 599$ | 8 | $I_{CQI/PMI} - 540$ | 4 |
| $600 \le I_{CQI/PMI} \le 659$ | 8 | $I_{CQI/PMI} - 600$ | 6. |

6. The apparatus of claim 2, wherein:
a CQI configuration for a reporting period of 1280 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $660 \le I_{CQI/PMI} \le 719$ | 8 | $I_{CQI/PMI} - 660$ | 0 |
| $720 \le I_{CQI/PMI} \le 779$ | 8 | $I_{CQI/PMI} - 720$ | 4 |
| $780 \le I_{CQI/PMI} \le 839$ | 8 | $I_{CQI/PMI} - 780$ | 8 |
| $840 \le I_{CQI/PMI} \le 899$ | 8 | $I_{CQI/PMI} - 840$ | 12. |

7. The apparatus of claim 2, wherein:
a CQI configuration for a reporting period of 2560 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $900 \le I_{CQI/PMI} \le 959$ | 32 | $I_{CQI/PMI} - 900$ | 0. |

8. The apparatus of claim 1, wherein the periodic CSI report is transmitted in a physical uplink control channel (PUCCH) in at least one narrowband data channel of the unlicensed band, the narrowband data channel selected in accordance with frequency hopping information stored in the memory.

9. The apparatus of claim 8, wherein a CQI configuration has a nesting structure in which the CQI and PMI share a common PUCCH pool where a PUCCH occasion of a larger period overlaps with a PUCCH occasion of a shorter period.

10. The apparatus of claim 9, wherein the CQI configuration includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $0 \le I_{CQI/PMI} \le 59$ | 1 | $I_{CQI/PMI}$ | 0 |
| $60 \le I_{CQI/PMI} \le 119$ | 2 | $I_{CQI/PMI} - 60$ | 0 |
| $120 \le I_{CQI/PMI} \le 179$ | 2 | $I_{CQI/PMI} - 120$ | 1 |
| $180 \le I_{CQI/PMI} \le 239$ | 4 | $I_{CQI/PMI} - 180$ | 0 |
| $240 \le I_{CQI/PMI} \le 299$ | 4 | $I_{CQI/PMI} - 240$ | 1 |
| $300 \le I_{CQI/PMI} \le 359$ | 4 | $I_{CQI/PMI} - 300$ | 2 |
| $360 \le I_{CQI/PMI} \le 419$ | 4 | $I_{CQI/PMI} - 360$ | 3 |
| $420 \le I_{CQI/PMI} \le 479$ | 8 | $I_{CQI/PMI} - 420$ | 0 |
| $480 \le I_{CQI/PMI} \le 539$ | 8 | $I_{CQI/PMI} - 480$ | 2 |
| $540 \le I_{CQI/PMI} \le 599$ | 8 | $I_{CQI/PMI} - 540$ | 4 |
| $600 \le I_{CQI/PMI} \le 659$ | 8 | $I_{CQI/PMI} - 600$ | 6 |
| $660 \le I_{CQI/PMI} \le 719$ | 16 | $I_{CQI/PMI} - 660$ | 0 |
| $720 \le I_{CQI/PMI} \le 779$ | 16 | $I_{CQI/PMI} - 720$ | 4 |
| $780 \le I_{CQI/PMI} \le 839$ | 16 | $I_{CQI/PMI} - 780$ | 8 |
| $840 \le I_{CQI/PMI} \le 899$ | 16 | $I_{CQI/PMI} - 840$ | 12 |
| $900 \le I_{CQI/PMI} \le 959$ | 32 | $I_{CQI/PMI} - 900$ | 0. |

11. The apparatus of claim 1, wherein:
the processing circuitry comprises a baseband processor configured to encode transmissions to, and decode transmissions from, the base station.

12. A non-transitory machine-readable storage device including instructions stored thereon that, when executed by an enhanced Machine Type Communication (eMTC) user equipment (UE), configure the eMTC UE to perform operations comprising:
receive cell-specific reference signals (CRS-RSs) from a radio access network (RAN) in an unlicensed band;
determine a Channel Quality Indicator (CQI) and Precoding Matrix Index (PMI) from the CRS-RSs;
determine, from a frequency hopping sequence, a data channel in the unlicensed band; and
transmit, to the RAN in a physical uplink control channel (PUCCH) of the data channel, a periodic Channel State Information (CSI) report, the CSI report containing the CQI and PMI, the periodic CSI report generated at a $n_{sf}^{rel}$ th subframe of a $n_{mframe}$th mframe, where $n_{mframe}$ satisfies:

$$n_{mframe} \bmod N_{pd,mframe} = N_{OFFSET,mframe}$$

where $N_{pd,\ mframe}$ is a reporting period in terms of mframes and $N_{OFFSET,\ mframe}$ is a reporting period offset in terms of mframes, and $n_{sf}^{rel}$ satisfies:

$$n_{sf}^{rel} - 20 = N_{OFFSET,CQI}$$

where $N_{OFFSET,CQI}$ is a reporting period offset in subframes.

13. The medium of claim 12, wherein:
a CQI configuration for a reporting period of 80 ms and 1.60 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $0 \leq I_{CQI/PMI} \leq 59$ | 1 | $I_{CQI/PMI}$ | 0 |
| $60 \leq I_{CQI/PMI} \leq 119$ | 2 | $I_{CQI/PMI}-60$ | 0 |
| $120 \leq I_{CQI/PMI} \leq 179$ | 2 | $I_{CQI/PMI}-120$ | 1. |

14. The medium of claim 12, wherein:
a CQI configuration for a reporting period of 320 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $180 \leq I_{CQI/PMI} \leq 239$ | 4 | $I_{CQI/PMI}-180$ | 0 |
| $240 \leq I_{CQI/PMI} \leq 299$ | 4 | $I_{CQI/PMI}-240$ | 1 |
| $300 \leq I_{CQI/PMI} \leq 359$ | 4 | $I_{CQI/PMI}-300$ | 2 |
| $360 \leq I_{CQI/PMI} \leq 419$ | 4 | $I_{CQI/PMI}-360$ | 3. |

15. The medium of claim 12, wherein:
a CQI configuration for a reporting period of 640 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $420 \leq I_{CQI/PMI} \leq 479$ | 8 | $I_{CQI/PMI}-420$ | 0 |
| $480 \leq I_{CQI/PMI} \leq 539$ | 8 | $I_{CQI/PMI}-480$ | 2 |
| $540 \leq I_{CQI/PMI} \leq 599$ | 8 | $I_{CQI/PMI}-540$ | 4 |
| $600 \leq I_{CQI/PMI} \leq 659$ | 8 | $I_{CQI/PMI}-600$ | 6. |

16. The medium of claim 12, wherein:
a CQI configuration for a reporting period of 1280 ms and 2560 ms includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $660 \leq I_{CQI/PMI} \leq 719$ | 16 | $I_{CQI/PMI}-660$ | 0 |
| $720 \leq I_{CQI/PMI} \leq 779$ | 16 | $I_{CQI/PMI}-720$ | 4 |
| $780 \leq I_{CQI/PMI} \leq 839$ | 16 | $I_{CQI/PMI}-780$ | 8 |
| $840 \leq I_{CQI/PMI} \leq 899$ | 16 | $I_{CQI/PMI}-840$ | 12 |
| $900 \leq I_{CQI/PMI} \leq 959$ | 32 | $I_{CQI/PMI}-900$ | 0. |

17. The medium of claim 12, wherein a CQI configuration has a nesting structure in which the CQI and PMI share a common PUCCH pool where a PUCCH occasion of a larger period overlaps with a PUCCH occasion of a shorter period.

18. The apparatus of claim 17, wherein the CQI configuration includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $0 \leq I_{CQI/PMI} \leq 59$ | 1 | $I_{CQI/PMI}$ | 0 |
| $60 \leq I_{CQI/PMI} \leq 119$ | 2 | $I_{CQI/PMI}-60$ | 0 |
| $120 \leq I_{CQI/PMI} \leq 179$ | 2 | $I_{CQI/PMI}-120$ | 1 |
| $180 \leq I_{CQI/PMI} \leq 239$ | 4 | $I_{CQI/PMI}-180$ | 0 |
| $240 \leq I_{CQI/PMI} \leq 299$ | 4 | $I_{CQI/PMI}-240$ | 1 |

-continued

| $I_{CQI/PMI}$ | Value of $N_{pd,mframe}$ | Value of $N_{OFFSET,CQI}$ | mframe offset $N_{OFFSET,mframe}$ |
|---|---|---|---|
| $300 \leq I_{CQI/PMI} \leq 359$ | 4 | $I_{CQI/PMI}-300$ | 2 |
| $360 \leq I_{CQI/PMI} \leq 419$ | 4 | $I_{CQI/PMI}-360$ | 3 |
| $420 \leq I_{CQI/PMI} \leq 479$ | 8 | $I_{CQI/PMI}-420$ | 0 |
| $480 \leq I_{CQI/PMI} \leq 539$ | 8 | $I_{CQI/PMI}-480$ | 2 |
| $540 \leq I_{CQI/PMI} \leq 599$ | 8 | $I_{CQI/PMI}-540$ | 4 |
| $600 \leq I_{CQI/PMI} \leq 659$ | 8 | $I_{CQI/PMI}-600$ | 6 |
| $660 \leq I_{CQI/PMI} \leq 719$ | 16 | $I_{CQI/PMI}-660$ | 0 |
| $720 \leq I_{CQI/PMI} \leq 779$ | 16 | $I_{CQI/PMI}-720$ | 4 |
| $780 \leq I_{CQI/PMI} \leq 839$ | 16 | $I_{CQI/PMI}-780$ | 8 |
| $840 \leq I_{CQI/PMI} \leq 899$ | 16 | $I_{CQI/PMI}-840$ | 12 |
| $900 \leq I_{CQI/PMI} \leq 959$ | 32 | $I_{CQI/PMI}-900$ | 0. |

19. An apparatus of radio access network (RAN) node, comprising:
processing circuitry arranged to:
encode cell-specific reference signals (CRS-RSs) for transmission in narrowband data channels in an unlicensed band to an enhanced Machine Type Communication (eMTC) user equipment (UE);
decode, from the eMTC UE in a physical uplink control channel (PUCCH) in one of the narrowband data channels, a periodic Channel State Information (CSI) report containing a Channel Quality Indicator (CQI) and Precoding Matrix Index (PMI) determined from the CRS-RSs, the periodic CSI report received at a $n_{sf}^{rel}$th subframe of a $n_{mframe}$th mframe, where $n_{mframe}$ satisfies:

$$n_{mframe} \bmod N_{pd,mframe} = N_{OFFSET,mframe}$$

where $N_{pd,\ mframe}$ is a reporting period in terms of mframes and $N_{OFFSET,mframe}$ is a reporting period offset in terms of mframes, and $n_{sf}^{rel}$ satisfies:

$$n_{sf}^{rel} - 20 = N_{OFFSET,CQI}$$

where $N_{OFFSET,CQI}$ is a reporting period offset in subframes; and
a memory configured to store the CSI report.

20. The apparatus of claim 19, wherein a CQI configuration has a nesting structure in which the CQI and PMI share a common PUCCH pool Where a PUCCH occasion of a larger period overlaps with a PUCCH occasion of a shorter period.

21. The apparatus of claim 20, wherein the CQI configuration includes:

| $I_{CQI/PMI}$ | Value of $N_{pd,mframe}$ | Value of $N_{OFFSET,CQI}$ | mframe offset $N_{OFFSET,mframe}$ |
|---|---|---|---|
| $0 \leq I_{CQI/PMI} \leq 59$ | 1 | $I_{CQI/PMI}$ | 0 |
| $60 \leq I_{CQI/PMI} \leq 119$ | 2 | $I_{CQI/PMI}-60$ | 0 |
| $120 \leq I_{CQI/PMI} \leq 179$ | 2 | $I_{CQI/PMI}-120$ | 1 |
| $180 \leq I_{CQI/PMI} \leq 239$ | 4 | $I_{CQI/PMI}-180$ | 0 |
| $240 \leq I_{CQI/PMI} \leq 299$ | 4 | $I_{CQI/PMI}-240$ | 1 |
| $300 \leq I_{CQI/PMI} \leq 359$ | 4 | $I_{CQI/PMI}-300$ | 2 |
| $360 \leq I_{CQI/PMI} \leq 419$ | 4 | $I_{CQI/PMI}-360$ | 3 |
| $420 \leq I_{CQI/PMI} \leq 479$ | 8 | $I_{CQI/PMI}-420$ | 0 |
| $480 \leq I_{CQI/PMI} \leq 539$ | 8 | $I_{CQI/PMI}-480$ | 2 |
| $540 \leq I_{CQI/PMI} \leq 599$ | 8 | $I_{CQI/PMI}-540$ | 4 |
| $600 \leq I_{CQI/PMI} \leq 659$ | 8 | $I_{CQI/PMI}-600$ | 6 |
| $660 \leq I_{CQI/PMI} \leq 719$ | 16 | $I_{CQI/PMI}-660$ | 0 |
| $720 \leq I_{CQI/PMI} \leq 779$ | 16 | $I_{CQI/PMI}-720$ | 4 |
| $780 \leq I_{CQI/PMI} \leq 839$ | 16 | $I_{CQI/PMI}-780$ | 8 |
| $840 \leq I_{CQI/PMI} \leq 899$ | 16 | $I_{CQI/PMI}-840$ | 12 |
| $900 \leq I_{CQI/PMI} \leq 959$ | 32 | $I_{CQI/PMI}-900$ | 0. |

\* \* \* \* \*